March 18, 1924.
J. R. BARTHOLOMEW
BRAKE SHOE HEAD
Filed Feb. 3, 1923
1,486,854
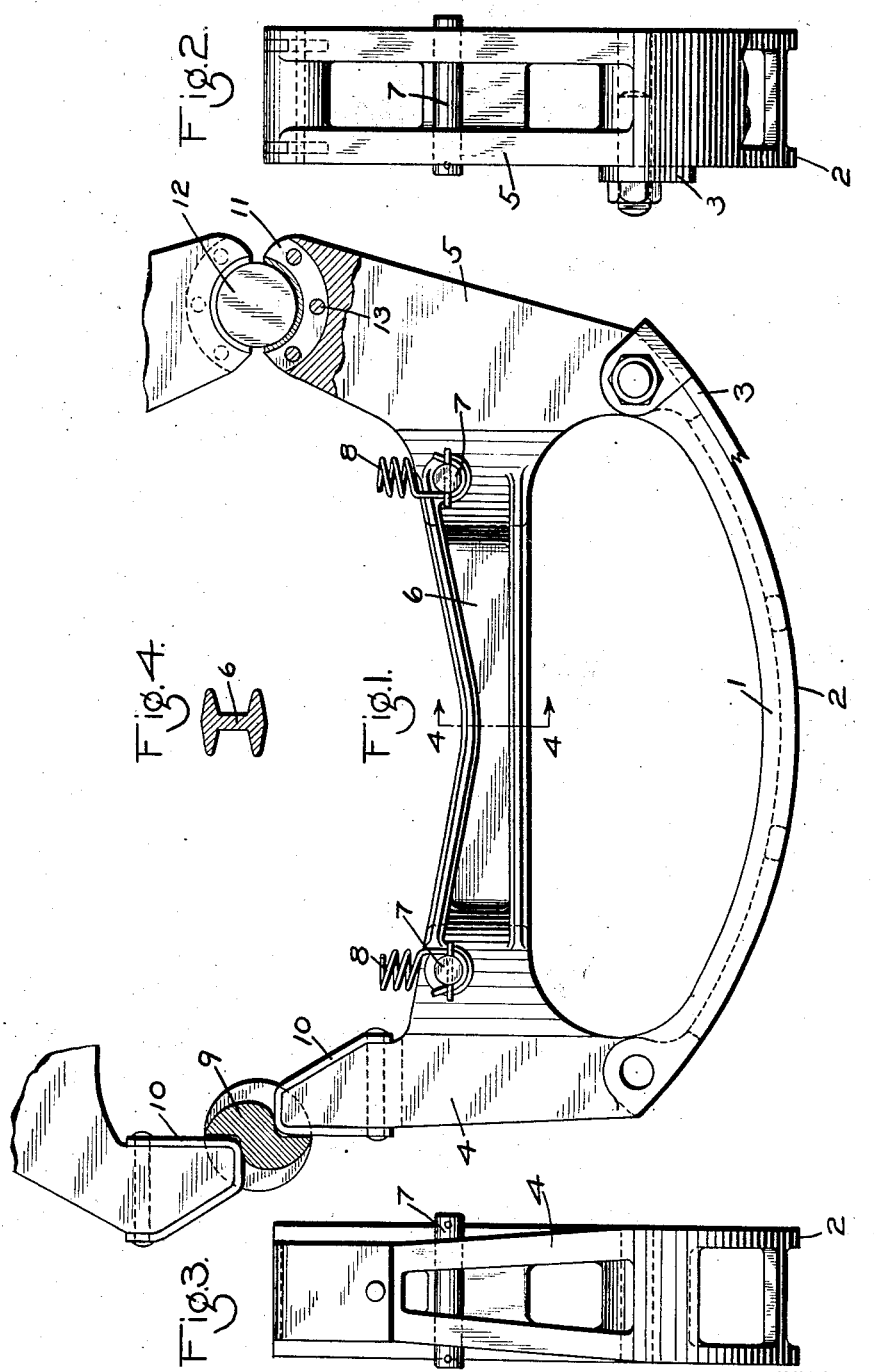
INVENTOR
JOHN R. BARTHOLOMEW
BY Wm. M. Cady
ATTORNEY Patented Mar. 18, 1924.

1,486,854

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE HEAD.

Application filed February 3, 1923. Serial No. 616,849.

*To all whom it may concern:*

Be it known that I, JOHN R. BARTHOLOMEW, a citizen of the United States, residing at Berkeley, in the county of Alameda and State of California, have invented new and useful Improvements in Brake-Shoe Heads, of which the following is a specification.

This invention relates to brake shoe heads, and more particularly to a type adapted for motor vehicle brakes.

The principal object of my invention is to provide an improved brake shoe head of the above type.

In the accompanying drawing; Fig. 1 is a side elevation of a brake shoe head embodying my invention; Fig. 2 an end elevation of the pivot pin end of the brake head; Fig. 3 an end elevation of the cam end of the brake head; and Fig. 4 a section on the line 4—4 of Fig. 1.

The brake shoe head shown in the drawing comprises an arcuate section 1 having a face 2 for receiving a brake shoe 3. Extending from the opposite ends of the section 1 are end sections 4 and 5 and said sections are tied together by an I section rib 6 provided with pins 7 for holding the ends of release springs 8.

The end portion 4 is provided with a nose for engaging the operating cam 9 and said nose is encased in a hardened steel wear strip 10. The brake shoe head is preferably made of aluminum in order to provide a very light construction and the wear strip 10 is then employed to provide against excessive wear. The end portion 5 is provided with a brass bearing 11 for pivot pin 12 and preferably said bearing is cast into the brake head casting, the bearing 11 being provided with flanges having openings 13 through which the metal of the brake head flows when the head is cast, so that the bearing is securely held in position.

A strong, wear resisting, and yet light weight brake shoe head is thus provided, which is particularly suitable for use in connection with automotive brakes of the internal expanding drum type.

Having now described my invention, what I claim as new and desire to secure by Letters Patent, is:

1. A brake shoe head comprising an arcuate section for receiving a brake shoe, end sections connected to opposite ends of the arcuate section, and a rib having an I section and integrally connecting said end sections.

2. A brake shoe head comprising an arcuate section for receiving a brake shoe, end sections connected to opposite ends of the arcuate section, one end section having a nose for engaging an operating cam, and a hardened steel wear plate enclosing said nose.

3. A brake shoe head comprising an arcuate section for receiving a brake shoe, end sections connected to opposite ends of the arcuate section, one end section having a separate metal bearing member for the pivot pin which is cast into the metal of the brake head.

4. A brake shoe head comprising an arcuate section for receiving a brake shoe, end sections connected to opposite ends of the arcuate section, one end section having a separate metal bearing member for the pivot pin which is cast into the metal of the brake head, and the other end section having a nose for engaging an operating cam and having a hardened steel wear plate enclosing said nose.

In testimony whereof I have hereunto set my hand.

JOHN R. BARTHOLOMEW.